United States Patent [19]
Brookstein

[11] Patent Number: 5,411,463
[45] Date of Patent: May 2, 1995

[54] COMPOSITE ROLL AND METHOD OF MAKING

[75] Inventor: David S. Brookstein, Wellesley, Mass.

[73] Assignee: Albany International Corp., Albany, N.Y.

[21] Appl. No.: 135,887

[22] Filed: Oct. 13, 1993

[51] Int. Cl.⁶ .............................................. B23P 15/00
[52] U.S. Cl. ...................... 492/38; 29/895.21; 29/895.32; 29/530; 492/39; 492/50; 492/52
[58] Field of Search .................. 492/52, 39, 50, 38; 29/895.21, 895, 895.32, 458, 530

[56] References Cited

U.S. PATENT DOCUMENTS

| | | |
|---|---|---|
| 1,365,606 | 1/1921 | Seymour-Jones ............ 492/38 |
| 1,390,019 | 9/1921 | Buchanan . |
| 1,410,546 | 3/1922 | Battey . |
| 2,342,159 | 2/1944 | Moran . |
| 2,651,241 | 9/1953 | Hornbostel . |
| 3,657,782 | 4/1972 | Mott . |
| 4,517,719 | 5/1985 | Okumura et al. ............ 492/38 |
| 4,974,782 | 12/1990 | Nelson ...................... 492/39 |
| 5,133,125 | 7/1992 | Diebels et al. . |
| 5,140,749 | 8/1992 | Sailas . |
| 5,301,610 | 4/1994 | McConnell ................. 492/52 |

FOREIGN PATENT DOCUMENTS 666332  7/1988  Switzerland ............... 492/50

*Primary Examiner*—Irene Cuda
*Attorney, Agent, or Firm*—Kane, Dalsimer, Sullivan, Kurucz, Levy, Eisele & Richard

[57] ABSTRACT

A fiber reinforced composite roll which utilizes a thin metal outer shell and in the interior thereof reinforced foam elements and resin and wherein each of said elements extends longitudinally the length of said shell.

21 Claims, 4 Drawing Sheets

COMPOSITE ROLL AND METHOD OF MAKING

FIELD OF INVENTION

The present invention relates to a composite roll, more particularly a roll made out of metal and fiber reinforced material.

BACKGROUND OF THE INVENTION

There presently exist a multitude of applications involving rolls used in heavy manufacturing processes. For example, in paper making machinery rolls are widely used and are usually of enormous length and size and operating at high speed. In this regard, paper making machinery has evolved to run faster and produce wider products. However, various roll applications have become more sensitive to increased speed and width especially where both these conditions are involved. Certain parts of such machines that are particularly affected by speed and width are the fly rolls and paper rolls. These positions convey the free sheet and since the sheet drives the rolls, the energy imparted to the roll from the sheet must be kept to a minimum. Accordingly, these rolls are designed with as small a diameter and as thin a wall as possible. These constraints can adversely affect the critical speed of the roll. The critical speed of a roll is essentially the rotational speed that is equivalent to the roll's natural frequency of vibration. If a roll is operating at these speeds, large transverse oscillations may occur which may cause, among other things, a sheet break.

However, the critical speed of a roll may be increased by increasing the stiffness-to-weight ratio of the roll. An approach to increasing this ratio is to substitute lighter materials for more dense metallic materials typically used such as stainless steel, steel, aluminum, and cast iron.

In addition to paper and fly rolls, which experience relatively low face loads, (for example, 5 pli, 0.00015 inches/inch of roll space) there are many roll positions on a paper machine with relatively high linear face loads. These include press section rolls (1000 pli) and felt rolls (30 pli). For these rolls the deflection is generally limited to 0.0002 inches/inch of roll face. To meet these deflection specifications, heretofore it was necessary to use rolls with relatively thick walls. While critical speeds for these rolls may be higher then production values, these rolls were still relatively thick and heavy. For instance, the enormity of the mass of rolls for wide (400-inch or wider) paper machines sometimes overtaxes conventional plant handling equipment. Also, the massive rolls require complex and expensive bearing systems along with high amounts of power to drive them. Accordingly, a reduction of roll weight by the use of lighter material would have many benefits.

SUMMARY OF THE INVENTION

Accordingly, it is an object of the invention to provide for a roll which is made as a composite that can meet the requirements associated with critical speeds and face deflection and also, be lower in mass then conventional rolls typically made of heavy metal material.

It is a further object of the invention to provide for such a composite roll which provides for high linear face loads.

It is a yet further object of the invention to provide for such a composite roll which allows for relatively easy fabrication.

It is a yet further object to provide for a composite roll which allows for its effective use in wide spread applications, particularly that of paper making machines.

The present invention provides for a fiber reinforced composite roll system that meets the requirements associated with critical speeds and face deflection while being lower in mass than typical conventional roll systems heretofore used. The system uses fiber reinforced composite components. The composite structure can be made with regions where their modules can be tailored to efficiently react to the local loadings.

There are several embodiments to the present invention. One embodiment involves producing multi-layer interlocking braided elements on rigid spacing mandrels. Pie-shaped wedges of honeycomb foam or other light weight material are formed into a mandrel by either a molding or machining operation. Alternatively, the mandrel is made of aluminum or other light metallic or non-metallic material. The reinforcing fibers such as aramide (also known as Kevlar®) and carbon are braided about the wedges. At the arc-shaped regions the braid would consist of relatively high linear density carbon fiber tows (axial yarns) and high braid angle lower linear density carbon fiber tows (bias yarns) on the side walls. The configuration of the high linear density tows would substantially contribute to the axial stiffness of a roll while the high braid angle low linear density yarns would efficiently react to the face loads which are axially directed. The pie-shaped braid covered wedges are then inserted into an annulus formed by the steel shaft and a relatively thin walled steel shell. Relatively low viscosity uncured thermosetting resin such as epoxy is then pumped through the annulus so that as it progresses from one end of the wedge-filled annulus to the other end, it impregnates the carbon fiber braids. After the entire length of the braided wedges are impregnated, heat is applied to actuate resin curing.

In another embodiment of the invention multi layer interlocking braided elements are provided on different shaped rigid foam mandrels. The most common shape is the equilateral triangle shape. Along with the inner segment shapes and the large and small outer segment shapes, they can be assembled together in a honeycomb fashion. By changing the configuration of the outer segments, different roll diameters (in increments of the length of the equilateral segment) can be produced using different external shell diameters. The braid angles and yarn sizes can be tailored for each type of segment to optimize the load bearing and stiffness of the roll. The various segments can be assembled into the annulus between the outer shell and shaft which are then impregnated using the resin molding process as aforesaid.

BRIEF DESCRIPTION OF THE DRAWINGS

Thus by the present invention its objects and advantages will be realized, the description of which should be taken in conjunction with the drawings wherein.

DETAILED DESCRIPTION OF THE PREFERRED EMBODIMENT

Figure 1:
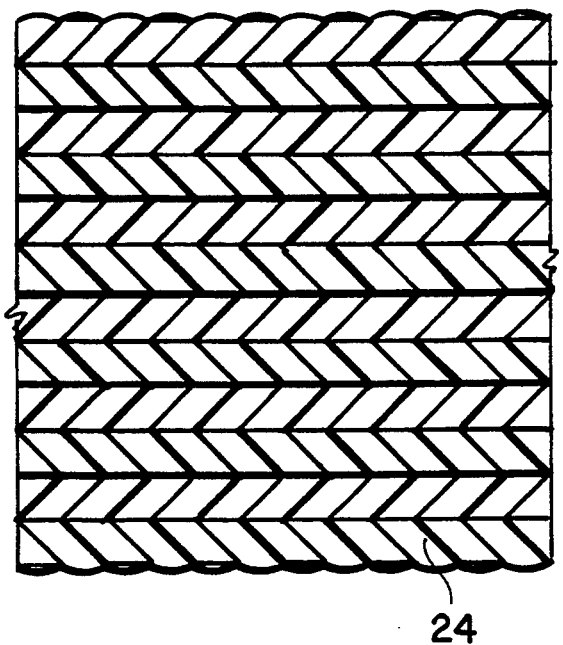
FIG. 1 is a side perspective view of multi-layered interlocking braided reinforcing fibers positioned about a mandrel, incorporating the teachings of the present invention.

Turning now more particularly to the drawings, there is shown a fiber reinforced composite roll 10. The roll 10 comprises a relatively thin outer shell 12 which is made of metal such as stainless steel, steel, aluminum or cast iron. Disposed within the shell 12 is a plurality of elongated foam mandrels 14. The mandrels are used essentially as spacers and can be made of any light weight metallic including aluminum alloys and the like which are formed into tubular wedge-shaped members, or alternately, of non-metallic materials such as honeycomb, rigid structural foam and so on. These rigid mandrels 14 may be formed, for example, by molding or machining or by any other means suitable for purpose. The mandrels 14 are pie shaped having an enlarged arch surface 16 which tapers down to a smaller arch surface 18. Positioned about the mandrels 14 are reinforcing fibers or yarns 20 made out of for example, aramide or carbon. Yarns 20 may be, for example, low linear density fiber tows or bias yarn provided at a high braid angle. Yarns 20 serve to react to the face loads in the axial direction. Along the arc shaped regions 16 and 18, relatively high linear density carbon fiber tows or axial yarns 22 are provided. Yarns 22 would contribute to the axial stiffness of the roll 10.

Figure 2:
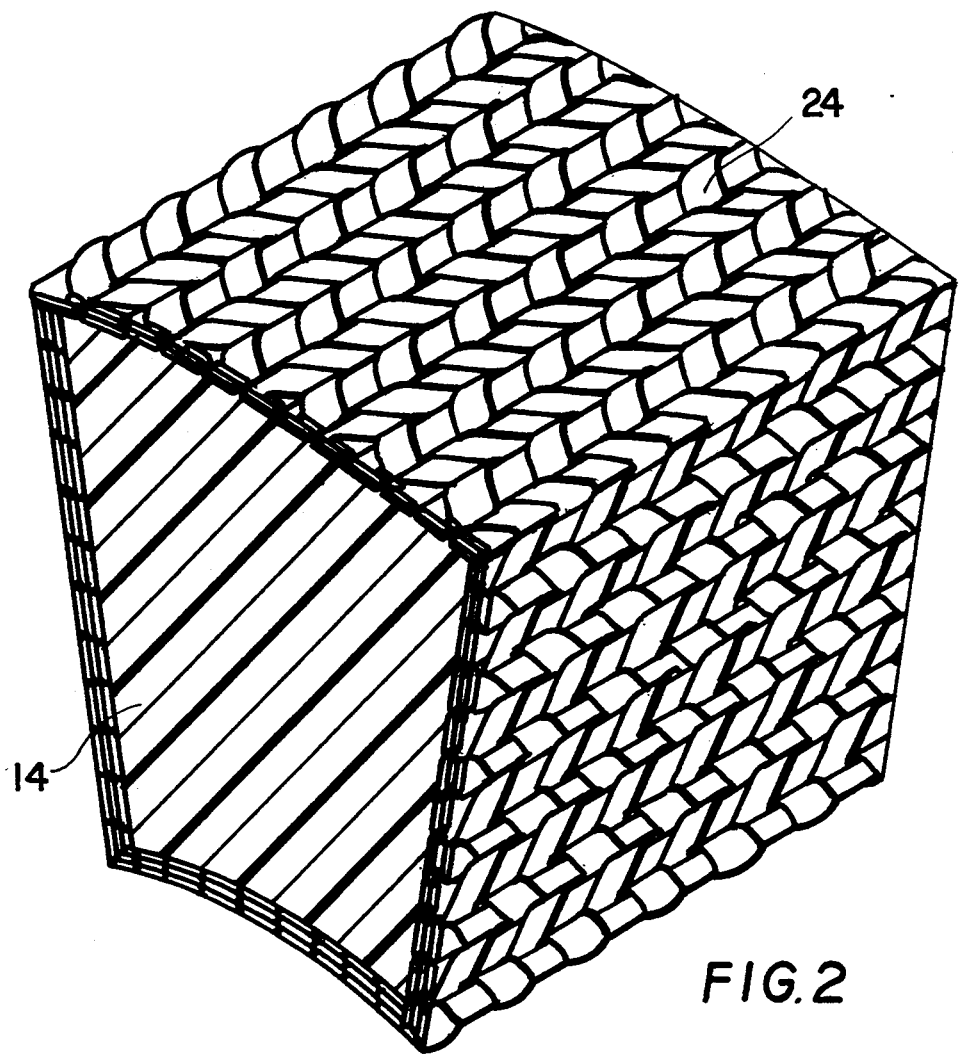
FIG. 2 is a partially sectional view of the fiber reinforced mandrel, incorporating the teachings of the present invention.
Figure 3:
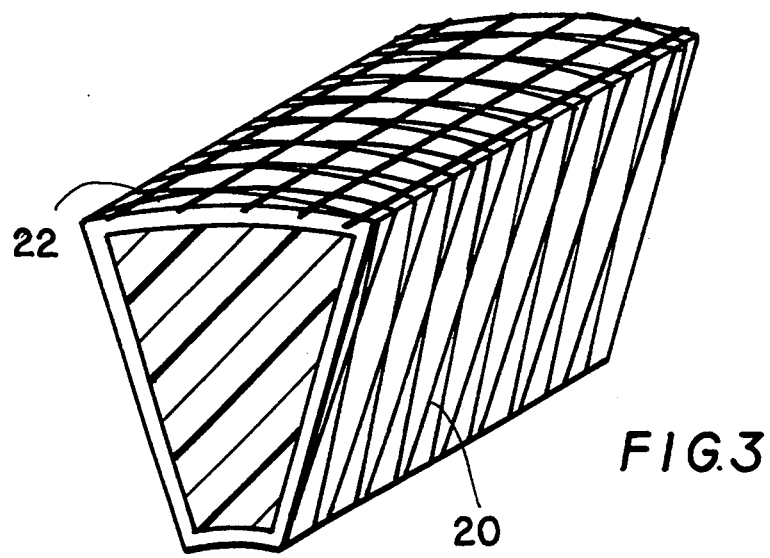
FIG. 3 is a partially sectional view of the fiber reinforced mandrel showing axial yarns and bias yarns, incorporating the teachings of the present invention.

These yarns may be provided in the form of a multi layer interlocking tubular braid arrangement 24 shown in FIGS. 1 and 2. This type of braid may be of the type disclosed in International Patent Publication No. W091/10766, the disclosure of which is incorporated herein by reference. This publication discloses a braided fabric comprising a plurality of interlocked layers which is produced by a plurality of package carriers of yarn which are constrained by track module to move along a plurality of serpentine paths. The track module extends in a first direction to define a longitudinally extending path corresponding to a first layer of the braided fabric and in a second direction to provide at least one cross-over path between adjacent serpentine paths. The package carriers are moved in the first direction to create a first layer of braid and along a crossover path between adjacent serpentine paths to cause the yarn forming said first layer of braid to be transported to interlock with the braid of an adjacent layer.

The device for the production of such a braided fabric utilizes a two-dimensional array of rotatable horn gears in toothed engagement; driving means for driving said array, each horn gear being arranged to rotate in a direction contrary to each inter engaging gear; a track means overlaying said array; and a plurality of yarn package carriers movable along said track means by said horn gear. The track means utilizes a plurality of track modules which together define a plurality of serpentine paths extending in a first direction, each serpentine path corresponding to a braid layer in said fabric and in which selected track modules include at last one cross-over path section extending in a second direction between one serpentine path and the next adjacent serpentine path to cause or allow the package carriers to move between adjacent serpentine paths to effect inter braiding of yarns between adjacent layers.

While such a braiding system may be utilized, other conventional braiding may also be used. In addition, the reinforcing could be incorporated through the use of a fabric lay up, tape lay up, filament winding or any other means suitable for purpose.

Once the pie shaped mandrels 14 are provided with the reinforcing yarns 20 and 22, in for example, the braided arrangement 24, they are inserted into the annulus formed between a center shaft 25 and the metal shell 12. At this point the ends of the roll 10 are sealed off, except to allow relatively low viscosity uncured thermosetting resin such as epoxy to be pumped through the annulus so that as it progresses from one end of the mandrel filled annulus to the other end whereby it impregnates the reinforcing fibers. This may be done by injecting the resin at one end or bottom and sucking it up with a vacuum to the other end. The steel shaft 25 and shell 12 act as a molding tool. After the entire lengths of fiber reinforced mandrels 14 are impregnated, heat is applied to activate resin curing. The impregnated resin in the figures is generally indicated about the mandrels 14 at 26. At this point, shaft 25 can be removed providing a center axial opening defined by surface 28. Appropriate fittings may then be applied to each end for mounting purposes.

Figure 4:
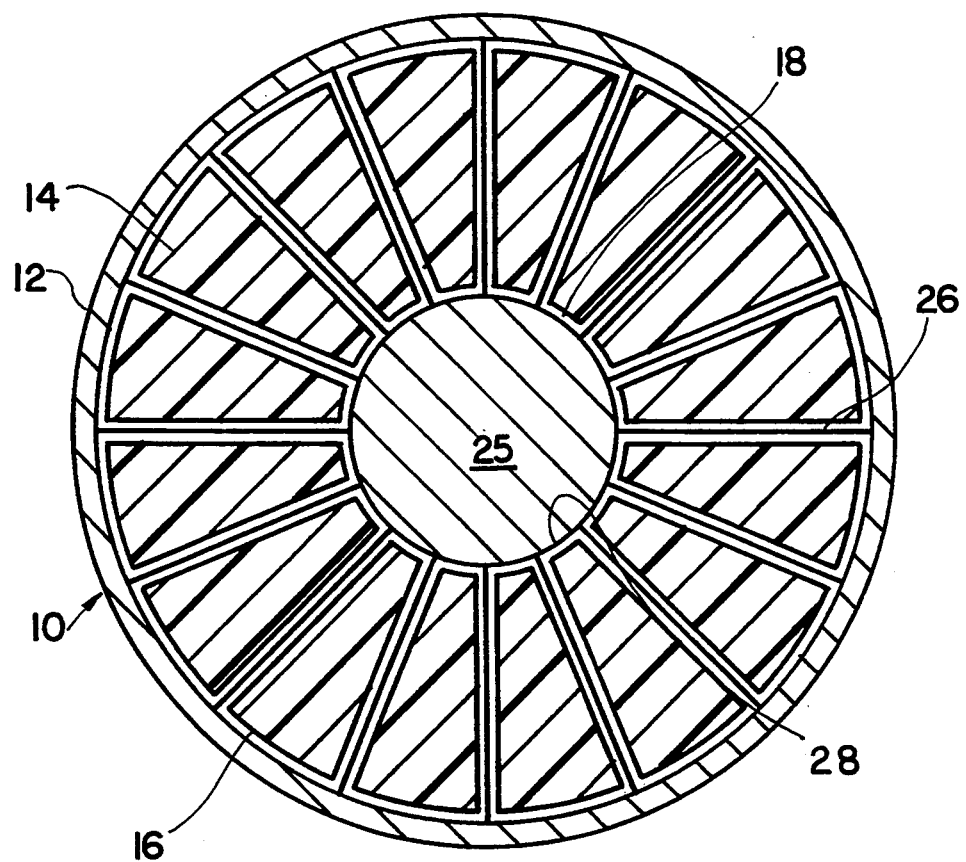
FIG. 4 is a sectional view of a composite roll having the fiber reinforced mandrel, incorporating the teachings of the present invention.
Figure 5:
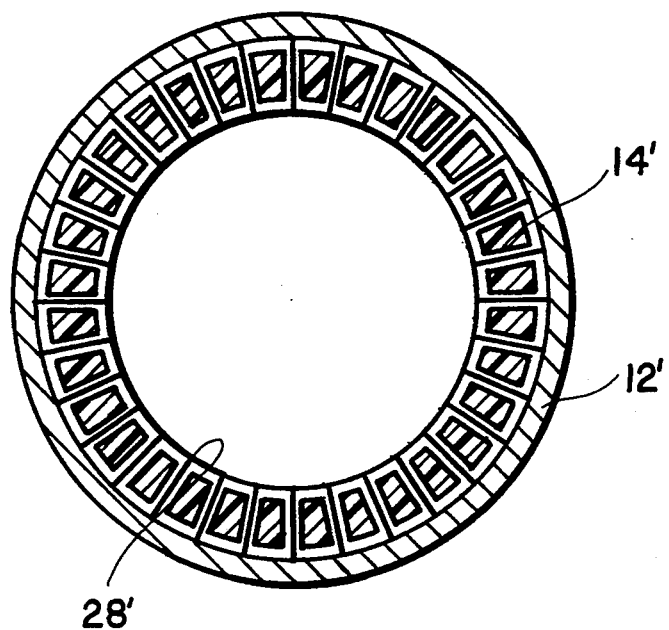
FIG. 5 is a sectional view of a composite roll having an increased internal diameter, incorporating the teachings of the present invention.
Figure 6:
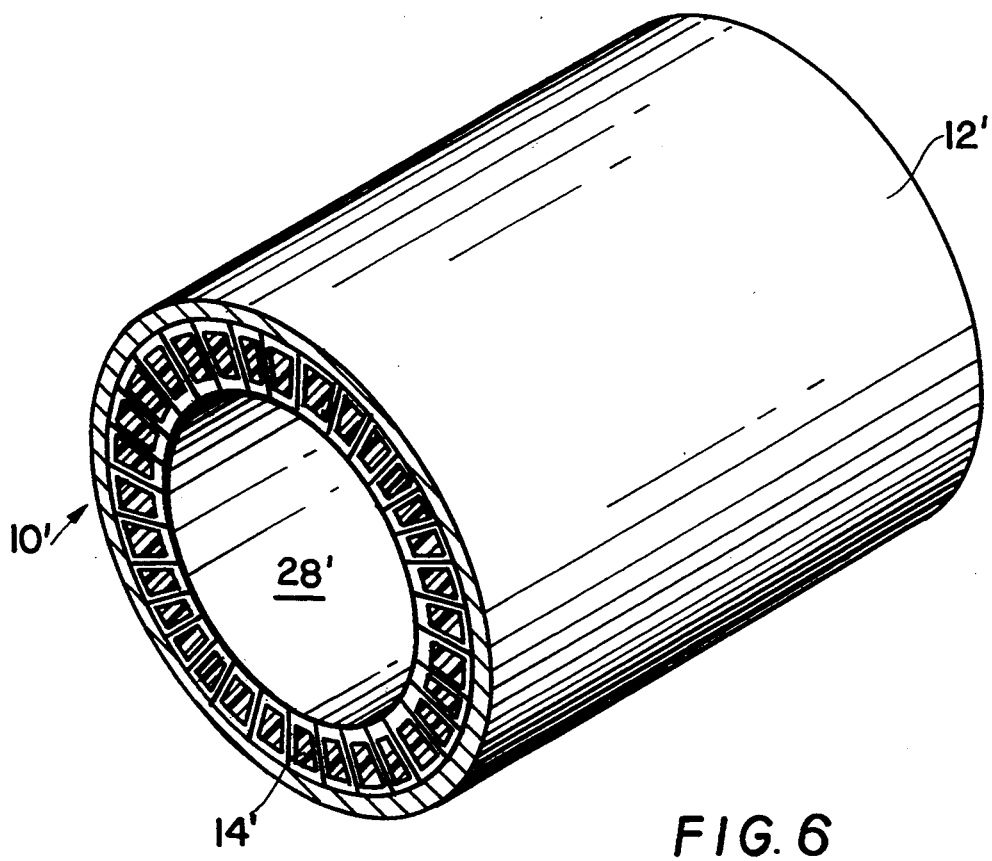
FIG. 6 is a partially sectional view of the composite roll shown in FIG. 5, incorporating the teachings of the present invention.
Figures 7, 8, 9, 10:
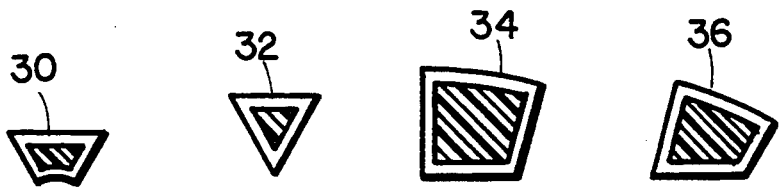
FIGS. 7-10 are section views of different shaped fiber reinforced mandrels, incorporating the teachings of the present invention.
Figure 11:
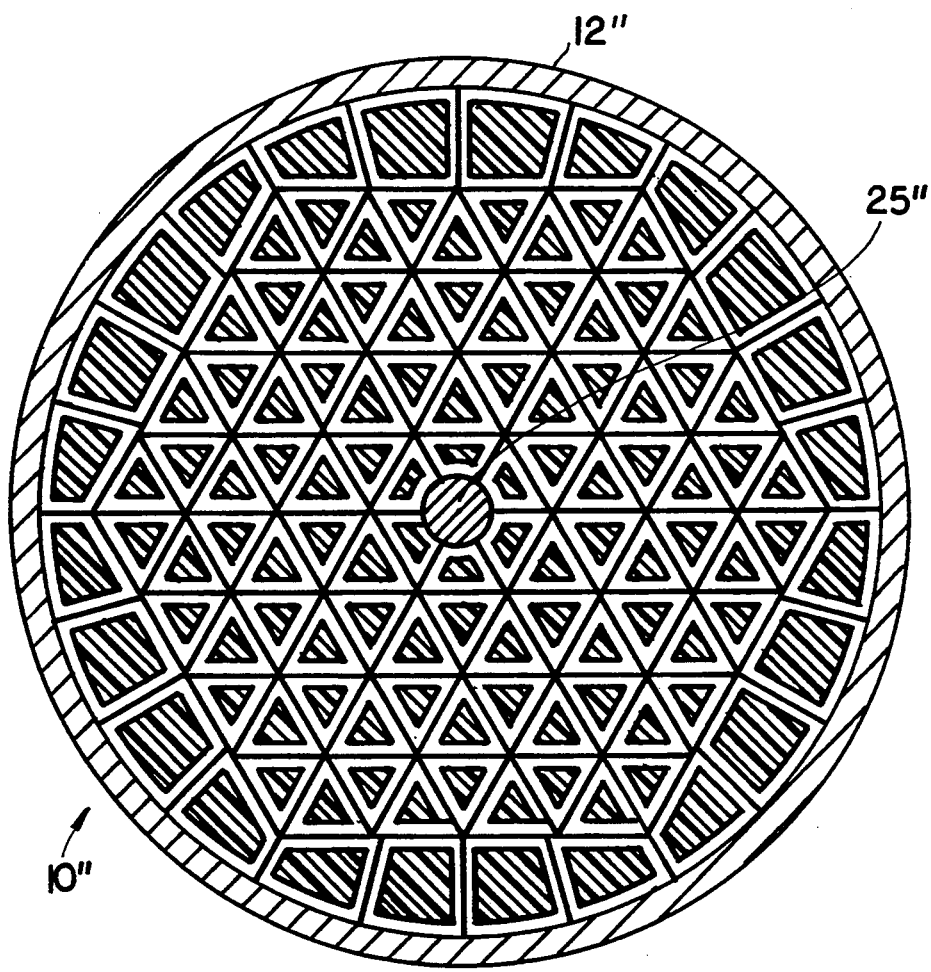
FIG. 11 is a sectional view of a composite roll which includes the different shaped mandrels, incorporating the teachings of the present invention.

As shown in FIGS. 4 and 5, the size of the axial opening can vary as desired depending upon of course, the structural specifications of the roll required and may be implemented by for example, using smaller mandrels 14 and a larger shaft member 25 (like elements to the earlier embodiment have been similarly numbered and designated with a prime).

With reference now to FIGS. 7-11, another embodiment of the invention involves utilizing several different shaped fiber reinforced rigid mandrels 30, 32, 34 and 36. The most common shape is the equilateral triangle shape 32. Along with the inner segment shapes 30 and the large 34 and small outer segment shape 36, they can be assembled together in a honeycomb fashion similar to that along the lines of that shown in FIG. 11. Regarding FIG. 11, similar elements to that of the prior embodiments have been similarly numbered and designated with a double prime. By changing only the configuration of the outer segments 34 and 36, different roll diameters and for that matter the size of center axial opening (in increments of the length of the equilateral segment 32) can advantageously be produced using different external shell 12″ diameters. Moreover, the braid angles and yarn sizes can be tailored for each type of segment to optimize the load bearing and stiffness of the roll 10″ for the particular application. As in the case of the previously mentioned embodiment, the various segments can assemble into the annulus between the outer shell 12" and the shaft 25" and can then be impregnated using the resin to complete the composite.

Thus, by the present invention, its objects and advantages are realized, and although preferred embodiments have been disclosed and described in detail herein, its scope should not be limited thereby, rather its scope should be determined by that of the appended claims.

What is claimed is:

1. A roll comprising:
    a tubular shell haveing a hollow interior area;
    a plurality of fiber reinforced elongated elements contained in said interior area, each of said elements extending longitudinally the length of said shell; and
    resin bonding said elements together so as to be fixed in said interior area.

2. The invention in accordance with claim 1 wherein said shell is made of a metal such as steel, stainless steel, aluminum or cast iron.

3. The invention in accordance with claim 1 wherein said elements comprise rigid foam about which reinforcing members are disposed.

4. The invention in accordance with claim 3 wherein said reinforcing members include reinforcing yarn comprising high linear density axial yarns and low linear density bias yarns.

5. The invention in accordance with claim 4 wherein said yarns are formed into a multi layer interlocking tubular braid disposed about the elements.

6. The invention in accordance with claim 3 wherein said yarns are formed into a multi layer interlocking tubular braid disposed about the elements.

7. The invention in accordance with claim 5 wherein said elements are pie shaped having respective arc shaped regions on which the axial yarns are located and sidewalls on which the bias yarns are located.

8. The invention in accordance with claim 7 which includes an axial opening through the internal area.

9. The invention in accordance with claim 3 which includes an axial opening through the internal area.

10. The invention in accordance with claim 9 which includes a plurality of elements having different shapes which allow the interior area to be filled in a honeycomb fashion.

11. The invention in accordance with claim 10 wherein said shapes allow said elements to fill substantially the entire interior area with the exception of the axial opening.

12. The invention in accordance with claim 11 wherein said yarns are formed into a multi-layer interlocking tubular braid disposed about the element.

13. The invention in accordance with claim 3 wherein said reinforcing members are braided.

14. A method of making a composite roll, comprising the steps of:
    providing a tubular shell axially positioned about a center shaft to provide an annulus therebetween;
    providing a plurality of elements about which reinforcing members are placed, each of said elements extending longitudinally the length of said shell;
    inserting said elements into the annulus;
    filling substantially all space remaining in the annulus with resin; and
    curing said resin.

15. The invention in accordance with claim 14 which further includes the steps of:
    providing a shell made of metal such as steel, stainless steel, aluminum or cast iron; and
    providing elements made of rigid foam.

16. The invention in accordance with claim 15 which further includes the step of:
    placing reinforcing yarn about the elements.

17. The invention in accordance with claim 16 which further includes the step of:
    forming said yarn into a multi-layer interlocking tubular braid disposed about the elements.

18. The invention in accordance with claim 16 which further includes the steps of:
    providing elements of different shapes and filling substantially the entire annulus in a honeycomb fashion.

19. The invention in accordance with claim 18 which further includes the step of:
    forming said yarns into a multi-layer interlocking tubular braid about said element.

20. The invention in accordance with claim 19 which further includes the step of:
    removing the center shaft.

21. The invention in accordance with claim 16 which further includes the step of:
    removing the center shaft.

* * * * *